United States Patent

[11] 3,604,444

[72] Inventor Percy G. Tacchi
 Bridgnorth, England
[21] Appl. No. 877,944
[22] Filed Nov. 19, 1969
[45] Patented Sept. 14, 1971
[73] Assignee Well's Asbestos and Engineering Limited
 Slough, Buckingham, England

[54] DEVICE FOR MIXING HOT AND COLD FLUIDS
 10 Claims, 7 Drawing Figs.
[52] U.S. Cl.................................................. 137/111,
 137/564.5, 137/636.4, 236/12 A
[51] Int. Cl....................................................... F16k 19/00
[50] Field of Search............................................. 137/90,
 111, 630.2, 636.4; 236/12 A

[56] References Cited
UNITED STATES PATENTS
942,405 12/1909 McNeil......................... 137/111
3,468,344 9/1969 Sanford......................... 137/636.4

Primary Examiner—Robert G. Nilson
Attorney—Friedman & Goodman

ABSTRACT: A device for mixing steam and cold water to provide a supply of substantially constant temperature hot water, comprising a body having inlet valves for the steam and water, each inlet valve being opened, against spring pressure, by a slidably mounted control rod with the free ends of the two control rods being both engaged by a control member movable in a chamber with the interior of the body in which the steam and water mix. A flexible diaphragm extends across the interior of the body with one side of the diaphragm exposed to the pressure in the mixing chamber and the other side exposed to the pressure of the cold water on the upstream side of the cold water control valve by means of a bypass passage leading from the cold water inlet. Connected to the diaphragm, on the mixing chamber side thereof, is a member which engages directly with one end of said control member. The control member has two discreet cam profiles on its exterior, one for each of the two control rods, and as the diaphragm moves, due to the differential pressure across it, the control member is moved so that the cam profiles engage the control rods to move these and open the cold water and steam inlet valves. The cam profiles are arranged so that the cold water inlet valve opens before the steam inlet valve and the steam inlet valve closes first.

FIG 1.

PERCY GEORGE TACCHI
INVENTOR

Friedman & Goodman
Attorneys

FIG. 2.

DEVICE FOR MIXING HOT AND COLD FLUIDS

BACKGROUND OF THE INVENTION

1. Field of the invention

This invention relates to a device for mixing hot and cold fluids to produce a supply of hot fluid, of the general kind which comprises a mixing chamber within a body which has valve controlled inlets for the hot and cold fluids and an outlet for the hot mixture, with temperature and/or pressure-responsive means, within the body, exerting control over the valves controlling the fluid inlets.

2. Description of the prior art

There have been proposals for a mixing device of this general kind wherein a piston, constituting a pressure-sensitive device, is so arranged within the body of the device as to be subjected to differential pressure from the moving flow of cold fluid when the device is in operation, said piston being adapted to operate the opening and closing of a valve which controls the hot fluid inlet whereby variation in the rate of flow of fluid through the device causes movement of the piston and corresponding movement of said valve.

The main object of the invention is to provide an improved form of device for mixing hot and cold fluids and a further object of the invention is to provide such a device having means also for dispensing a secondary fluid, mixed with either a flow of cold fluid or with a flow of hot fluid.

SUMMARY OF THE INVENTION

According to the invention we provide a device for mixing hot and cold fluids comprising a body having an inlet for the cold fluid and valve means for controlling said inlet, and inlet for the hot fluid and valve means controlling this inlet, a mixing chamber within the body wherein the hot and cold fluids mix, and outlet for the fluid mixture from the body, a valve control member within the body adapted to control the opening and closing of both said control valve means, and a pressure responsive device connected to said valve control member and being under the influence of the pressure of the cold fluid on the upstream side of the cold fluid inlet valve, the valve control member being constructed and arranged to that, upon increase in the effective pressure influencing said pressure responsive device, the valve control member is moved to progressively open said control valve means controlling the cold and hot fluid inlets, the the cold fluid inlet control valve means being opened before the hot fluid inlet control valve means and being closed after the hot fluid inlet control valve means has closed.

Each control valve means may comprise a valve control rod mounted for rectilinear sliding movement in the body and having one of its ends acting upon a valve member which controls the associated inlet, the other end of each such control rod being engaged by the said valve control member.

The valve control member may be arranged so that it moves between the said other ends of the control rods and may be of a generally frustoconical form and arranged so that in the closed positions of both valve members the said other ends of the control rods are engaging at or near the smaller cross section end of the valve control member and as the valve control member is moved by the said pressure-responsive device it traverses between the said other ends of the control rods and moves these to effect progressive opening of the valve members controlled thereby.

In furtherance of the objects of the invention, to incorporate in the device means for dispensing secondary fluid (e.g. a detergent, with the fluid discharged from the device, there may be included a pumping device, for injecting the secondary fluid, comprising a piston and cylinder unit, wherein the relative reciprocation between piston and cylinder is obtained from the movement of the pressure responsive device. The pressure responsive device may be a diaphragm and in one form the piston may be fixed in the body of the device with the cylinder connected to and moving with the diaphragm and in an alternative form the cylinder may be fitted in the body of the device with the piston connected to and moving with the diaphragm.

BRIEF DESCRIPTION OF THE DRAWINGS

Embodiments of the invention are hereinafter described, by way of example, and reference is made to the accompanying drawings wherein.

DESCRIPTION OF PREFERRED EMBODIMENTS

Figure 1:
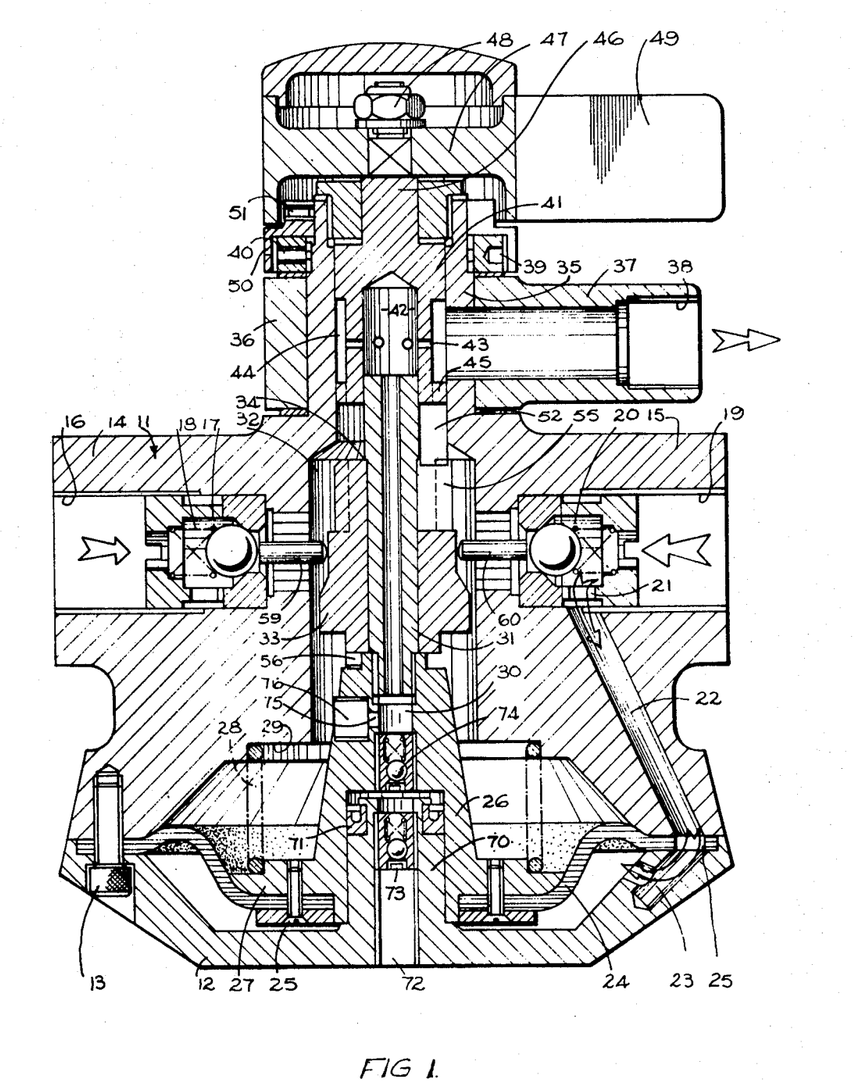
FIG. 1 is a cross section through one form of device embodying the invention.
Figure 2:
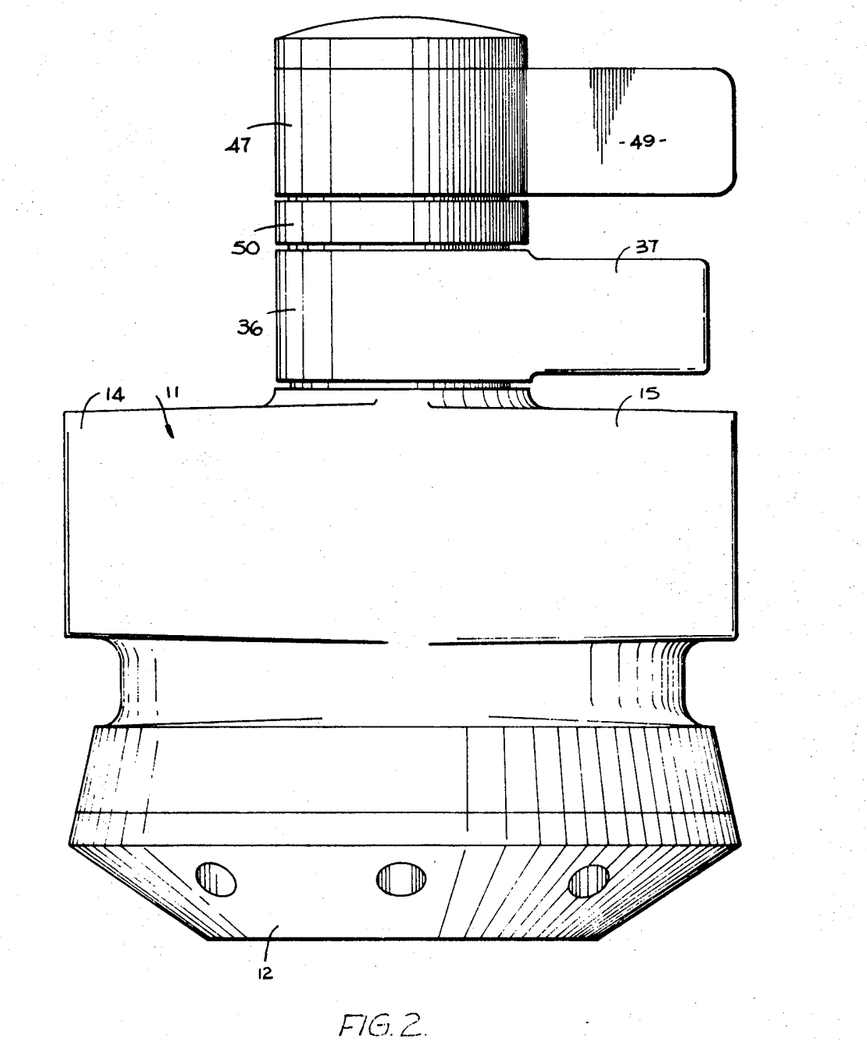
FIG. 2 is a view in side elevation showing the external configuration of the device.

In FIG. 1, the device is shown in an upright position in which it may be used and it would be provided with a suitable form of fixing bracket (not shown) by means of which it could be fitted to a wall or other support so as to occupy this upright position. However, by the use of appropriate brackets, or other fixing means, the device may occupy and desired position (in accordance with the particular site conditions) between the upright position as shown and a horizontal position in a plane at 90° to that shown in FIG. 1. In this example the main body of the device is in two parts, there being an upper part 11 and a lower part 12 which is secured to the upper part by a number of screws 13. Also, in this example, the device is described for the mixing of steam and cold water to provide a hot water service, although it will be understood that the device may be used for mixing other fluids.

At diametrically opposed positions the part 11 of the body is provided with laterally projecting bosses 14 and 15 which are adapted to form the connections for a supply of steam and cold water respectively, so that, as shown in FIG. 1, the entry for steam is on the left-hand side and the entry for cold water on the right-hand side. Referring to the left hand side of FIG. 1, the boss 14 has an internally threaded axially extending passage 16 to which is adapted to be connected, by a suitable adopter, a steam supply pipe from a suitable source and fitted within the end of the passage 16 is a know form of spring-loaded ball control valve, generally indicated by reference numeral 17, the spring acting on the ball being indicated at 18.

The right hand boss 15 is similarly provided with an internally threaded passage 19 which is adapted to have connected thereto, by means of a suitable adapter, a pipe for supplying cold water and at the inner end of such passage 19 there is also fitted a know form of spring-loaded ball control valve, generally indicated by reference numeral 20. The arrows on the left- and right-hand sides of the drawing indicate respectively the directions of flow of steam and cold water into the valve.

On the upstream side of the ball in the control valve 20 there is provided an opening 21 communicating with a bypass passage 22 extending through the part 11 of the body and this passage 22 communicates via a passage 23 in the base 12 of the body with the underside of the elastomeric diaphragm 24 which is secured at its peripheral edge and firmly clamped between the parts 11 and 12 of the valve body, being provided with an opening 25 to provide the communication between the bypass passage 22 and the passage 23 leading to the underside of the diaphragm.

Secured to the diaphragm 24 by screws 25 is a member 26, of substantially frustoconical form, and having at its lower end a radially extending flange 27, and a coil spring 28 acts between this flange and an internal shoulder 29 in the body part 11 and normally acts to urge the member 26 and diaphragm 24 in the downwards direction as seen in FIG. 1.

The member 26 has a central axial passage 30 in its upper part and the upper end of this passage is internally threaded and has screwed therein the lower externally threaded end of a tube 31 which extend upwardly through a central cylindrical passage 32 formed in the body part 11. This passage 32 constitutes the mixing chamber within the body of the device and there is rotatably mounted upon the central tube 31 and member 33 which constitutes the valve control member, hereinbefore referred to, and which has thereon a cam profile which is described in detail later on. The valve control member 33 is located on the central tube 31 against axial displacement thereon by the engagement of its lower end against the upper end of the member 26 and by the engagement of its upper end against a shoulder 34 formed on the exterior of the central tube 31.

The body part 11 has an upwardly extending tubular part 35, about which is mounted a collar 36 and this collar has a radially extending tubular part 37 which forms the outlet for the fluid mixture discharged from the device, and at its outer end 38 is adapted to be connected by means of a suitable adapter to a pipe which conveys the hot fluid to the apparatus with which it is to be used. (The combined collar 36 and tube 37 is normally referred to as a "banjo" fitting).

A locking ring 39, which is internally threaded, is screwed on to the upper end of the tubular part 35 and is locked in position by a grub screw 40 to clamp the collar part 36 firmly in position with the interposition of suitable sealing washers between the locking ring 39 and the collar 36 and between the collar 36 and the body part 11. Preferably these sealing washers are formed of polytetra fluoroethylene, or a plastics material having similar properties, which enables the collar 36 to be swiveled in relation to the body of the device so that during installation the hot fluid outlet 38 can be positioned in any desired angular position relative to the body of the device, or, where the outlet 38 is connected to a flexible hose supplying a movable apparatus, the collar 36 can swivel during operation to follow movement of the hose as the apparatus is moved.

Mounted upon the upper end of the central tube 31 is a sleeve 41 which has a central cavity 42 communicating via a plurality of passages 43 with an annular exterior recess 44 which is in communication with the passage extending through the tubular outlet 37. At its lower end the sleeve 41 has a plurality of passages 45 extending through the flange at the bottom to enable fluid to pass from the mixing chamber 32 into the annular space 44 and thus into the discharge passage in the discharge tube 37.

The sleeve 41 has at its upper end an upwardly extending stem 46 upon which is mounted a circular disc member 47 secured by means of a nut 48 and having a radially extending handgrip portion 49 which, when turned about the central axis of the body of the device, has the effect of rotating the sleeve 41. An indicator ring 50 is mounted about the locking ring 39 and is secured to the upper end of the tubular part 35 by a grub screw 51 and on its exterior face the ring 50 has markings for hot and cold positions and when the valve is in use the handgrip portion 49 can be turned between these markings to a selected position according to the desired temperature required for the mixture from the discharge outlet 37.

At its lower end the sleeve 41 has a downwardly extending lug 52 which engages slidably in a longitudinally extending slot provided in the valve control member 33 for a purpose hereinafter described in more detail with reference to the detailed description of the valve control member 33.

Figure 3:
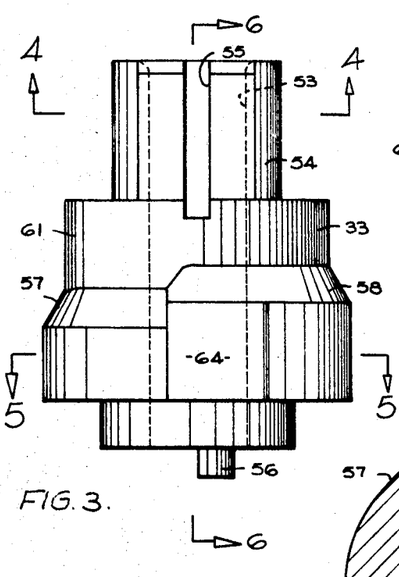
FIG. 3 is a detail view of the valve control member.

Referring now to FIGS. 3, 4, 5 and 6, the valve control member is shown in FIG. 3 in a view inside elevation which is taken from a view point at 90° to the position shown in FIG. 1 in order to illustrate more clearly the profiles of the cams on the valve control member 33.

The main body part of the valve control member 33 is of cylindrical configuration and has a passage 53 extending axially therethrough. At its upper end there is a reduced extension 54 in which is provided a longitudinally extending slot 55 which is the slot in which is slidably engaged the lug 52 at the lower end of the sleeve 41 hereinbefore mentioned. At its lower end the main body of the valve control member has a downwardly extending lug 56 which, as seen in FIG. 1, engages in a part cut away in the top end of the frustoconical member 26, such cutaway part extending through an arc of approximately 160° so as to limit the extent of angular movement of the valve control member 33 in relation to the fixed frustoconical member 26.

The main body of the valve control member has formed thereon two cam profiles, indicated at 57 and 58, which profiles control the opening and closing of the steam and cold water valves respectively. Referring to FIG. 1, on the downstream side of the steam control valve 17 there is mounted slidably in a guide sleeve formed in the body of the device a valve control rod 59 which operates between the ball of the control valve 17 and the valve control member 33. Similarly, on the other side, on the downstream side of the cold water control valve 20, there is mounted slidably in a guide in the body of the device a valve control rod 60 which operates between the ball of the cold water control valve 20 and the valve control member 33. In the position of the parts shown in FIG. 1, the valve control rods 59 and 60 are in register with the plain cylindrical part 61 of the valve control member and both control valves 17 and 20 are in the closed position.

Figure 5:
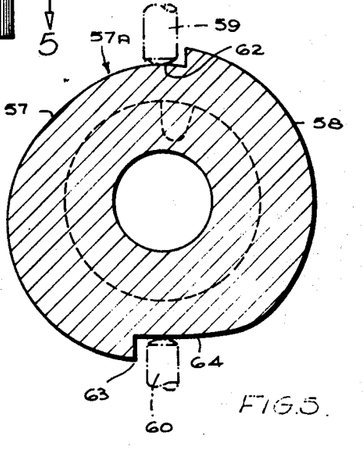
Figure 6:
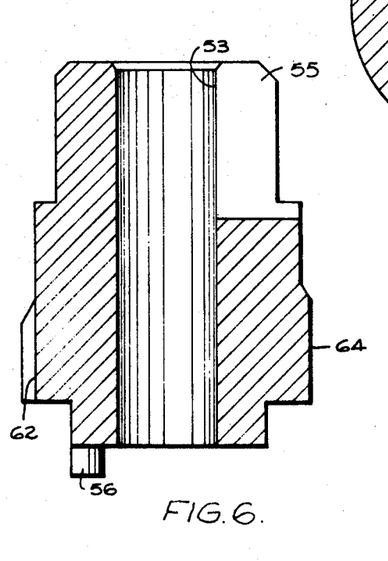

The cam profile 57 controlling the steam control valve is spaced closer to the lower edge of the valve control member than is the cam profile 58 and also the cam profile 57, as will be seen from FIG. 5, has a periphery which, commencing from the end 62, has a dwell portion 57A of constant radial distance for an arc of 45° and then increases progressively in its radial distance from the central axis of the member 33 round to the end of the profile at 63 where it is at a maximum radial distance form the central axis.

The cam profile 58 controlling the control rod 60 of the cold water control valve is of constant radial distance in its profile throughout the whole of its periphery except for an arc of 45° at its commencement at 64 in which it increases sharply from a minimum, in which it is flush with the plain cylindrical part 61, out to the constant radial distance for the remainder of its profile.

Figure 4:
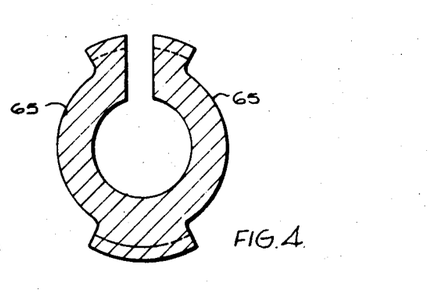
FIGS. 4, 5, and 6 are sections respectively on the lines 4—4, 5—5 and 6—6 of FIG. 3.

Referring to FIG. 4 which shows the cross section on the upper part 54 of the valve control member it will be observed that this has two parts 65 which are reduced in section and the reason for this will be appreciated from the following description of the working of the device as these reduced section parts 65 are required to provide annular spaces for the passage of the fluid when the upper part of the valve control member has moved into the reduce section part of the tabular member 35 in the upper part 11 of the body of the device.

As an example of one field of application, the device could be used to supply hot water to some apparatus which had its own "on-off" control valve such as, for example, a spray gun which may be used for hosing and washing down purposes in a variety of places such as dairies and breweries. In such applications, after the device has been set ready for operation, as hereinafter described, the actual operation of the device itself is controlled by the "on-off" control which is on the spray gun or other apparatus which the device is supplying with hot water.

With the valve control member in its lower position, as shown in FIG. 1, and with the valve control member also positioned angularly, as seen in FIG. 5, the device is in a completely closed condition and if the "on-off" valve on the apparatus, such as a spray gun, were opened then in this case the device would deliver a supply of cold water only, as hereinafter mentioned.

For operating the device to deliver a hot water mixture produced by the mixing of steam and cold water the hand grip part 49 is first rotated in the appropriate direction which would be clockwise as viewed in plan, as in FIG. 5, to move this towards the hot marking as displayed on the indicator ring 50 and if the maximum temperature for the hot water was required then the hand grip portion 49 would be turned to a position which would bring the highest portion of the profile of the steam control cam profile 57 into register with the control rod 59 of the steam control valve. It will be appreciated that the movement of the handgrip portion 49 causes rotation of the sleeve 41 and rotation of the valve control member 33 by virtue of the fact that the lug 52 on the sleeve 41 is engaged in the slot 55 in the valve control member and such rotation of the valve control member being limited by the engagement of the lug 56 on its lower end in the arcuate cut away part at the top of the frustoconical member 26.

For an intermediate temperature between cold and hot, the hand grip portion 49 would be rotated only partially so as to bring a portion of the profile 57 in between its beginning 62 and end 63 into register with the valve control rod 59.

With the parts in equilibrium as shown in FIG. 1, there is no flow through the device and the pressure on opposite sides of the diaphragm 24 is equal. The pressure of the cold water in the cold water supply is communicated to the underside of the diaphragm by the bypass passage 22.

When the "on-off" control valve of the apparatus (e.g. spray gun) is opened there is a drop in pressure within the body of the device and on the upper side of the diaphragm 24 with the result that the cold water pressure, acting on the under side of the diaphragm, causes this to lift and thus move the valve control member 33 upwardly until the cam profile 58 first makes contact with the inner end of the valve control rod 60 and moves this to the right, as seen in FIG. 1, so as to partially open the control valve 20 and allow cold water to enter the mixing chamber 32 within the body of the device. There is a drop in pressure in the cold water, in passing through the control valve 20, and thus still a resultant differential pressure acting on the under side of the diaphragm 24 which causes further upwards movement of the valve control member 33 and results in the cam profile 57 coming into contact with the inner end of the valve control rod 59 and moving this to the left, as seen in FIG. 1, thus opening the control valve 17 to admit steam into the mixing chamber 32. A position of equilibrium is eventually reached when the pressure within the mixing chamber 32 plus the restoring force of the spring 28 is balanced by the pressure of the cold water acting on the under side of the diaphragm 24 and the device is then delivering a supply of hot water at the selected temperature.

Taking the example of the apparatus, which is being used, as being a spray gun, them, when the operator actuates the trigger of the spray gun to open the main "on-off" valve thereon, the device will operate as above described to deliver the hot water to the spray gun for the required period. As soon as the operator releases the trigger to close the "on-off" valve of the spray gun then there is a buildup of pressure within the mixing chamber and above the diaphragm 24 in the device with the result that this buildup of pressure, assisted by the return spring 28, moves the diaphragm downwardly taking with it the central tube 31 and the valve control member 33 so that eventually the valve control member has moved downwardly to the position where its plain cylindrical portion 61 registers with the valve control rods 59 and 60 so that these are then free to move inwardly and the control valves 17 and 20 can close under the influence of their internal springs acting on the balls of these valves. Owing to the difference in height of the cam profiles 57 and 58 from the base of the valve control member it will be understood that the steam control valve 17 closes first followed shortly after by the closure of the cold water control valve 20.

Referring back to FIG. 1, the embodiment of the invention shown there also includes means for injecting a secondary fluid into the hot water discharge from the valve and this secondary fluid may be, for example, a detergent for washing purposes or disinfectant or bactericide or for other purposes or it may be an additive for dealing with cases where the water used in the valve is of a hard nature.

The device embodies a pumping device for injecting this secondary fluid and the base part of the body is provided with a central axially upstanding boss 70 which is slidably engaged within an axially extending cylindrical recess in the frustoconical member 26, the end of the boss within the recess being provided with a sealing ring 71 so that the boss 70 is acting as a fixed piston working within a movable cylinder provided by the cylindrical recess within the frustoconical member 26.

The boss 70 has an axially extending internal passage 72 which is internally threaded and adapted to have connected thereto, by means of a suitable threaded adapter a supply pipe leading to a container for the secondary fluid and fitted within the inner end of the passage 72 is a known form of spring-loaded nonreturn ball valve, indicated at 73. Fitted within the passage 30 in the frustoconical member 36 is a similar nonreturn valve, indicated at 74.

The arrangement immediately above described therefore acts as a pumping device because as the frustoconical member 26 rises during normal operation of the device a quantity of secondary fluid is drawn into the space above the sealing ring 71 past the nonreturn valve 73 and remains in this space until such times as the operation of the spray gun or other apparatus causes the frustoconical member 26 to move downwardly and then the quantity of secondary fluid is discharged past the nonreturn ball valve 74 and passes upwardly through the central passage in the tubular member 31 and out through the openings 43 into the discharge passage in the discharge member 37 so that the next time the apparatus is operated to affect a discharge of hot water this hot water carries with it a secondary fluid which may be detergent, disinfectant etc. as above referred to.

Thus, an operator using a spray gun supplied by the mixing device of the invention and desiring to use a quantity of detergent can, by suitable operation of the spray gun, ensure that the detergent is delivered. The operator would close down the spray gun momentarily so as to cause the frustoconical member 26 to descend and discharge a quantity of secondary fluid via the central tube 31 and passages 43 and then upon opening up the spray gun again this detergent would be discharged with the flow of hot water.

An alternative discharge outlet for the secondary fluid is provided in the frustoconical member 26 by means of a passage 75 which, when not required for use, can be closed and sealed off by a screwed plug 76. If the secondary fluid required is for the purpose of water softening then the screw plug 76 would be removed so that the water softener would then be discharged directly into the mixing chamber of the space above the diaphragm 24 so as to act upon the cold water entering the device. Where the secondary fluid is a disinfectant or bactericide or the like which might have a corrosive effect upon the interior parts of the device, then the discharge via the central tube 31 will always be used to ensure that any such fluid having corrosive effects is discharged directly into the outlet 37 without any possibility of it coming into contact with the interior parts of the device.

Figure 7:
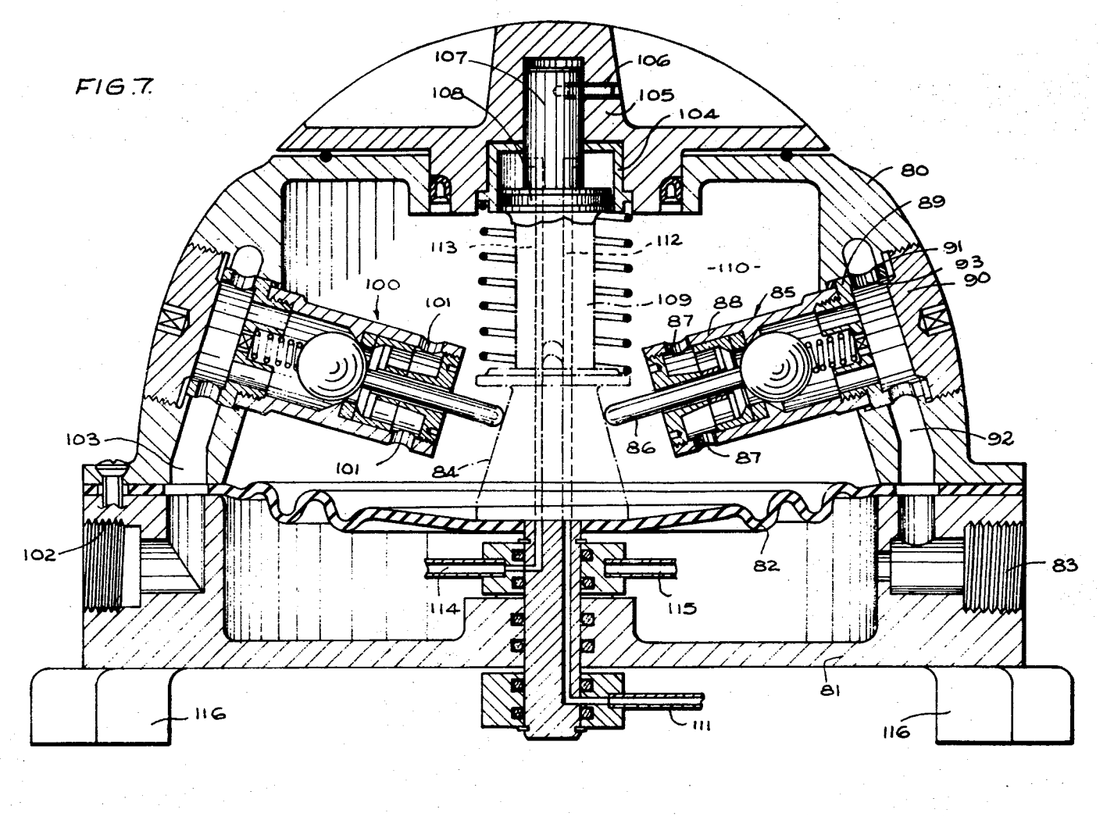
FIG. 7 is a cross section through another form of device embodying the invention.

Referring now to the other embodiment of the invention shown in section in FIG. 7. In FIG. 7, the upper part of the body of the device is indicated at 80 and the lower base part 81 with the diaphragm being indicated at 82 and in this case the main inlet for cold water at 83 is in the base part of the device so that instead of the cold water pressure being communicated to below the diaphragm by means of a bypass passage, as in the FIG. 1 construction, the full mains cold water pressure is communicated below the diaphragm 82 by virtue of the fact that in this case the inlet of the cold water at 83 is in the base part of the device.

In this embodiment the valve control member corresponding to the part 33 in the FIG. 1 construction is indicated in outline only in chain dotted lines at 84 and in the view shown the cold water control valve, indicated generally at 85, has its valve control rod 86 cooperating with the valve control member 84 but inclined at an acute angle to the vertical axis of the valve control member 84 so that control rod 86 is normal to the surface of control member 84. Also the outlet from the control valve 85 is via passages 87 which extend radially in relation to the control rod 86 so that discharge from the control valve does not impinge directly upon the valve control member 84. The steam control valve 100 on the left hand side of FIG. 7 is arranged in the same manner so that its axis is at an acute angle to the vertical axis of the valve control member 84 and the discharge of steam is via passages 101 in radial directions in relation to the axis of the valve control member so that steam is discharged in a direction where it does not impinge directly upon the valve control member 84. This arrangement of radial discharge of the incoming fluids, particularly in connection with the incoming steam, ensures that any droplets of water carried by the steam are not directed against the profiled surface of the valve control member 84 which might result in scoring and wearing away of the surface of the valve control member 84.

It will also be observed from FIG. 7 that the control valve 85 is a completely self-contained unit housed within its own cylindrical housing 88 and secured in an aperture in the upper part of the body 80 by means of a locating collar 89, the outer end of which is closed by a cap 90 screwed into the body part 80 and sealed by a suitable sealing washer 91. A bypass passage 92 in the wall of the upper body part 80 communicates with the cold water inlet 83 and cold water enters the control valve 85 via a passage 93 in the wall of the collar 89. With this arrangement, when it is desired to inspect the control valve 85 for servicing or replacement the whole unit can be removed by unscrewing the cap 90 and withdrawing the assembly of housing 88 and collar 89 after which removal of the collar 89 enables the interior of the control valve to be dismantled for servicing. The steam control valve 100 on the other side, being of exactly similar construction, can also be removed in this manner for inspection, servicing and replacement if required. The steam inlet 62 is also in the base 81 of the device and steam enters the control valve 100 via a bypass passage 103. The use of the self-contained units 85, 100, for the cold water and steam control valves means that both these can be removed for inspection and replacement or servicing without having to break the main inlet supplies of cold water and steam to the base of the device.

The self-contained control valve units for steam and cold water could also advantageously be used in the embodiment of FIG. 1 and arranged in the inclined positions as illustrated in FIG. 7. Also it would be advantageous to incorporate in such self-contained units, nonreturn valves on the upstream side of each control valve. In the actual construction of FIG. 1 nonreturn valves could be incorporated, as an integral part of the device, in the inlet openings 16 and 19 on the upstream side of the respective control valves.

A further difference in FIG. 7 as compared with FIG. 1, is in connection with the position of the pumping device for injecting secondary fluid. Instead of the pumping device being located at the bottom of the device and in the form of a fixed piston and reciprocating cylinder, as in FIG. 1, the pumping device is embodied in the upper part of the valve and in this case is in the form of a moving piston and a fixed cylinder.

In this case the cylinder comprises a cylindrical liner 104 fitted in a recess in the underside of the hand control knob 105 which is secured by grub screw 106 to the upper end of the control spindle 107 which has connection with the valve control member 84. The piston 108 is a flange on a sleeve 109 slidable on the spindle 107 and moved upwardly by the upwards movement of the valve control member 84.

In the base part 81 of the device there is provided an outlet (not shown) for the hot water and also and alternative outlet (not shown), each at 90° to the inlets 83, 102, and connected via passages extending through the wall of base part 81 to the interior 110 of the body part 80 (which forms the mixing chamber); one of these outlets would be used, the other being sealed off by a plug, according to the orientation of the device. The inlet for secondary fluid is via a connection and nonreturn fluid is via a connection and nonreturn valve (not shown) through valve passage 112 up the control spindle 107 to the interior of the cylinder 104. Outlet form the cylinder 104 is via a passage 113 leading to two alternative discharge tubes 114, 115; each of these leads to one or the other of the hot water outlets (not shown) via a nonreturn valve, and depending upon which outlet was being used then one or the other of the discharge tubes 114, 115 would be sealed off with a plug. In this manner, upwards movement of the diaphragm 82 causes piston 108 to discharge the quantity of secondary fluid which has been previously drawn into the cylinder by the downwards movement of the diaphragm (and piston 109).

The device of FIG. 7 is provided with feet or lugs 116 by means of which it may be attached to a support. In the case of a wall or other vertical support the device would occupy a horizontal position (at 90° to that shown in FIG. 7). Operation of the form of the device is otherwise the same as in the case of FIG. 1.

As previously mentioned with reference to FIG. 1, the cam profile 57 for the steam control valve has a dwell portion 57A of 45° of arc at its starting end. This is to enable a supply of cold water only to be delivered when required. If the hand control 49 is turned so that this dwell 57A is in register with the control rod 59 then upwards movement of the control member 33 will not cause any movement of the control rod 59 and no steam will be admitted. However, as there is a sharp rise on the cam profile 58 from its starting end the control rod 60 will be operated and cold water will be admitted.

An additional automatic control, which is not shown in the drawings, but which can be included if required is an independent thermostatic control for the steam and cold water control valves to enable the device to compensate automatically for any fluctuations in the temperature or pressure of the incoming fluids. For example, this may be achieved by the provision of a generally know form of capsule or bellows located underneath the valve control member 33 so as to be capable of influencing the movement of the control member 33 independently of the movement of the diaphragm 24.

The expressions "hot" and "cold" as used herein are to be understood as being used in the relative sense in that one fluid is at a higher temperature than the other, and also the expression "fluid" includes within its scope gaseous as well as liquid fluids.

I claim:

1. A device for mixing hot and cold fluids comprising a body having an inlet for the cold fluid and valve means for controlling said inlet, and inlet for the hot fluid and valve means controlling this inlet, a mixing chamber within the body wherein the hot and cold fluids mix, an outlet for the fluid mixture from the body, a valve control member within the body adapted to control the opening and closing of both said control valve means, and a pressure-responsive device connected to said valve control member and being under the influence of the pressure of the cold fluid on the upstream side of the cold fluid inlet control valve means, the valve control member being constructed and arranged so that, upon increase in the effective pressure influencing said pressure-responsive device, the valve control member is moved to progressively open said control valve means controlling the cold and hot fluid inlets, the cold fluid inlet control valve means being opened before the hot fluid inlet control valve means and being closed after the hot fluid inlet control valve means has closed.

2. A device according to claim 1 wherein each control valve means comprises a valve control rod mounted for rectilinear sliding movement in the body and having one of its ends acting upon a valve member which controls the associated inlet, the other end of each such control rod being engaged by the said valve control member.

3. A device according to claim 2 wherein the valve control member is arranged so that it moves between the said other ends of the control rods and is of a generally frustoconical form and arranged so that in the closed positions of both valve members the said other ends of the control rods are engaging at or near the smaller cross section end of the valve control member and as the valve control member is moved by the said pressure-responsive device it traverses between the said other ends of the control rods and moves these to effect progressive opening of the valve members controlled thereby.

4. A device according to claim 3 wherein the valve control member is part of a generally cylindrical body and the generally frustoconical form thereof comprises two peripherally extending cam profiles, one acting on each of the two control rods, the cam profile for the cold fluid valve control rod having a steep inclined start portion and then being of constant radial distance from the central axis of the cylindrical body for the rest of its peripheral extent and the cam profile for the hot fluid valve control rod having a dwell portion at its start and then being of progressively increasing radial distance form the central axis of the cylindrical body to the end of its peripheral extent, one end of said cylindrical body being engaged by a member which is connected to the pressure-responsive device and the cold fluid cam profile being spaced from this said one end of the cylindrical body a further axial distance than the spacing of the hot fluid cam profile.

5. A device according to claim 4 wherein the body of the device is generally of cylindrical form and the pressure-responsive device is an elastomeric diaphragm extending transversely within the body to divide it into a mixing chamber for the hot and cold fluids on one side of the diaphragm and a space on the other side of the diaphragm which is in communication with the cold fluid supply, the mixing chamber side of the diaphragm having secured thereto a connecting member having at one end a radially extending flange by means of which it is secured to the diaphragm, and having secured to its other end a tube which extends centrally and axially through the mixing chamber, the said valve control member being mounted about said tube for rotational movement but being located against axial displacement thereon, there being spring means within the body of the device acting upon said radially extending flange tending to displace the said connecting member and central axially extending tube in the direction towards the cold fluid side of the diaphragm so as to move the valve control member into a position in which the valve control rods are out of contact with the cam profiles thereon and the respective control valve for the hot and cold fluids are in the closed position.

6. A device according to claim 5 wherein the connecting member has an internal cylinder recess forming the cylinder of a pumping device for injecting secondary fluid into the fluid mixture discharge of the device, the piston of which pumping device is formed by a boss extending axially from the body of the device on the cold fluid side of the diaphragm and entering said recess, there being a valve-controlled passage through the piston connecting to a source of secondary fluid and a valve-controlled passage through the connecting member extending from said recess and communicating with said central tube which extends axially through the mixing chamber and is arranged at its end remote from the connecting member to discharge secondary fluid into the outlet for the fluid mixture from the device.

7. A device according to claim 1 including a pumping device for injecting a secondary fluid into the fluid mixture discharged from the device, said pumping device comprising a piston and cylinder unit wherein the relative reciprocation between piston and cylinder of the unit is obtained from the movement of the pressure responsive device which is in the form of a diaphragm.

8. A device according to claim 7 wherein the piston is fixed in the body of the device and the cylinder is connected to and moves with the diaphragm.

9. A device according to claim 7 wherein the cylinder is formed in the body of the device and wherein the piston is connected to and moves with the said diaphragm.

10. A device according to claim 1 wherein each control valve means for the hot fluid and the cold fluid is a self-contained unit comprising a cylindrical housing which is detachably mounted within the body of the device, the control rod being slidably mounted in a guide within the housing, the arrangement being that each such unit can be removed from the device for servicing and replacement.

UNITED STATES PATENT OFFICE
CERTIFICATE OF CORRECTION

Patent No. 3,604,444              Dated September 14, 1971

Inventor(s) Percy G. Tacchi

It is certified that error appears in the above-identified patent and that said Letters Patent are hereby corrected as shown below:

On the cover sheet [73] Assignee "Well's Asbestos and Engineering Limited" should read -- Bell's Asbestos and Engineering Limited --.

Signed and sealed this 18th day of April 1972.

(SEAL)
Attest:

EDWARD M. FLETCHER, JR.           ROBERT GOTTSCHALK
Attesting Officer                Commissioner of Patents